United States Patent [19]

Chen

[11] Patent Number: 6,031,948
[45] Date of Patent: Feb. 29, 2000

[54] FUSED-FIBER MULTI-WINDOW WAVELENGTH DIVISION MULTIPLEXER USING AN UNBALANCED MACH-ZEHNDER INTERFEROMETER AND METHOD OF MAKING SAME

[75] Inventor: Peter Z. Chen, Fremont, Calif.

[73] Assignee: Applied Fiber Optics, Inc., Fremont, Calif.

[21] Appl. No.: 09/034,895

[22] Filed: Mar. 3, 1998

[51] Int. Cl.[7] ............................................. G02B 6/28
[52] U.S. Cl. ............................ 385/24; 385/37; 359/127
[58] Field of Search ................................ 385/15, 24, 27, 385/31, 32, 39; 359/114, 124, 127

[56] References Cited

U.S. PATENT DOCUMENTS

| | | | |
|---|---|---|---|
| 5,136,671 | 8/1992 | Dragone | 385/46 |
| 5,295,205 | 3/1994 | Miller et al. | 385/1 |
| 5,479,546 | 12/1995 | Dumais et al. | 385/43 |
| 5,636,309 | 6/1997 | Henry et al. | 385/129 |
| 5,809,190 | 9/1998 | Chen | 385/43 |
| 5,852,505 | 12/1998 | Li | 359/118 |
| 5,881,199 | 3/1999 | Li | 385/140 |

*Primary Examiner*—John D. Lee
*Assistant Examiner*—Victoria D. Hao
*Attorney, Agent, or Firm*—Skjerven, Morrill, MacPherson, Franklin, & Friel, LLP.; Tom Chen

[57] ABSTRACT

A structure and method are provided to improve stability and performance of multiplexers in dense WDM applications. A wavelength division multiplexer (WDM) utilizing an unbalanced Mach-Zehnder Interferometer has first and second fused-fiber couplers cascaded together by two optical connecting fibers having different optical path lengths. The different path lengths can be attained with connecting fibers of two different lengths or two different refractive indexes. In some embodiments, a portion of a fiber with a different refractive index than either or both connecting fibers is fuse-spliced between a connecting fiber to provide the path length difference. Tension can be applied to the fused-fiber multi-window WDM to obtain the desired passband prior to mounting the WDM within a supporting substrate for protection. A passive thermal compensation technique can be used to minimize the thermal effect on the passband wavelengths for dense WDM applications.

36 Claims, 7 Drawing Sheets

FUSED-FIBER MULTI-WINDOW WAVELENGTH DIVISION MULTIPLEXER USING AN UNBALANCED MACH-ZEHNDER INTERFEROMETER AND METHOD OF MAKING SAME

BACKGROUND OF THE INVENTION

1. Field of the Invention

The present invention relates to wavelength division multiplexers (WDMs) and, in particular, to multi-window WDMs (MWDMs) with fused-fiber Mach-Zehnder Interferometers (MZIs) and methods of making the same.

2. Discussion of the Related Art

With existing fiber optic networks, there is often the need to increase information transmission capacity. However, both physical and economic constraints can limit the feasibility of increasing transmission capacity. For example, installing additional fiber optic cable to support additional signal channels can be cost prohibitive, and electronic system components may impose physical limitations on the speed of information that can be transmitted. The use of wavelength division multiplexers (WDMs) provides a simple and economical way to increase the transmission capacity of fiber optic communication systems by allowing multiple wavelengths to be transmitted and received over a single optical fiber through signal wavelength multiplexing and demultiplexing. In addition, WDMs can be used in fiber optic communication systems for other purposes, such as dispersion compensation, noise reduction, and gain flatting, i.e., maintaining a uniform gain within the usable bandwidth for erbium doped amplifiers.

WDMs can be manufactured using, for example, biconical tapered fusion (BTF) technology. Typically, two optical fibers are fused together along an interior portion to form a fused-fiber coupler, so that light of two wavelengths (i.e., 1310 nm and 1550 nm) entering the input terminals of the first and second fibers, respectively, are multiplexed onto a single fiber. The coupling ratios for the two channels (the signals at 1310 nm and 1550 nm) exhibit complementary sinusoidal behavior for amplitude as a function of frequency within the passband of the WDM, with each channel having one or more peaks (or windows) within the passband. Information carried by the two signals along the single fiber is then demultiplexed at the WDM outputs.

Multi-window WDMs (MWDMs) have two or more peaks of amplitude as a function of frequency (or operational windows) for each channel within a passband. MWDMs can also be made using BTF technology by twisting two optical fibers together, fusing the center portion together, and pulling the fibers until a desired multi-window transmission spectrum appears at a monitored fiber output terminal. Such a long-tapered-fusing technology is discussed in commonly-owned U.S. patent application Ser. No. 08/799,582, entitled "Apparatus and Method of Making a Fused Dense Wavelength-Division Multiplexer", now U.S. Pat. No. 5,809,190 which is incorporated by reference herein in its entirety. However, it is difficult to make a high performance fused-fiber MWDM with a narrow band and narrow window spacing utilizing BTF technology because the MWDM may have a very long fused coupling region, which makes the MWDM extremely fragile. Also, the MWDM may exhibit long-term instability against environmental changes and poor uniformity over time.

Accordingly, a structure and method are desired which overcomes the disadvantages discussed above with respect to fused-fiber MWDMs.

SUMMARY OF THE INVENTION

The present invention provides a multi-window wavelength division multiplexer (MWDM) using a Mach-Zehnder Interferometer (MZI) which improves stability and performance in a dense WDM (DWDM) and a method of making such an MWDM.

In accordance with the present invention, two conventional fused-fiber couplers are connected by two connecting fibers with different optical path lengths to form a fused-fiber MWDM using a Mach-Zehnder Interferometer. Each connecting fiber connects an output terminal from the first coupler to an input terminal from the second coupler. By changing the optical path length difference between the two connecting fibers, the fused-fiber MWDM with desired channel spacing and passbands can be obtained.

In one embodiment, the optical path length difference can be changed by changing the refractive indexes of the connecting fibers relative to each other. One method is to make one of the connecting fibers more refractive index-sensitive to UV radiation, for example, by Ge-doping or hydrogen-loading, and then exposing both fibers to a level of UV radiation sufficient to obtain the desired difference between refractive indexes. Another method is to use connecting fibers of different refractive indexes. Yet another method is to fuse-splice a portion of fiber between a connecting fiber, with the fiber portion having a different refractive index or a different doping than the connecting fiber and/or the other connecting fiber.

In another embodiment, the optical path length difference is changed by differing the actual length between the two connecting fibers. One method is to form the two fused-fiber couplers with connecting fibers of different lengths. One of the connecting fibers can then be stretched to obtain the desired path difference.

Temperature-induced refractive index or optical path length changes in the connecting fibers can be compensated for by maintaining the optical path length difference as temperature increases. When the two connecting fibers are different lengths, the shorter fiber is mounted on a composite substrate such that, as temperature rises, the substrate expands to increase the tension and length of the shorter fiber to maintain a constant path length difference. In another embodiment, the longer fiber is mounted on a composite substrate such that, as temperature rises, the substrate contracts to decrease the tension and length of the longer fiber to preserve the desired path length difference. The two couplers at the ends of the connecting fibers can be secured at angles ranging from 0° to 180° from each other.

When the two connecting fibers are the same length, both ends of the connecting fibers can be mounted on a composite substrate such that, as temperature rises, the substrate expands to decrease the distance between the mounting points, thereby relieving tension in the fibers to provide passive thermal compensation. In other embodiments, the two fused-fiber couplers can be mounted on a substrate so that when temperature increases, the substrate bends upward and releases tension in the connecting fibers.

This invention will be more fully understood in light of the following detailed description taken together with the accompanying drawings.

BRIEF DESCRIPTION OF THE DRAWINGS

Use of the same reference numbers in different figures indicates similar or like elements.

DETAILED DESCRIPTION

The present invention provides a multi-window wavelength division multiplexer (MWDM) utilizing a Mach-Zehnder Interferometer (MZI) which improves stability and performance in dense WDM (DWDM) applications and a method of making such an MWDM.

Figure 1:
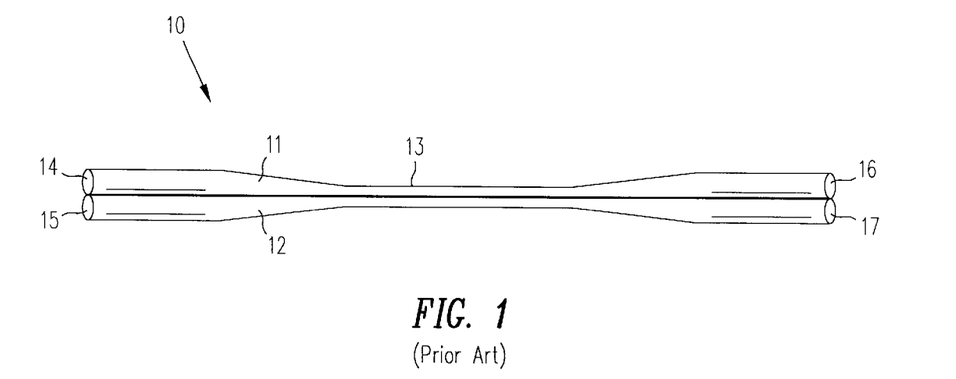
FIG. 1 shows a conventional fused-fiber coupler.

Biconical tapered fusion (BTF) technology has been used to fabricate a variety of optical fiber devices, such as couplers, attenuators, filters, and wideband WDMs. A typical fused-fiber coupler 10 is shown in FIG. 1. Fused-fiber coupler 10 can be formed by heating and axially stretching two optic fibers 11 and 12 to form a coupling region 13. Broadband light at two wavelengths, entering coupler 10 at input terminals 14 and 15, couple onto and travel along fused coupling region 13, and then decouple and exit coupler 10 at output terminals 16 and 17, respectively.

Figure 2:
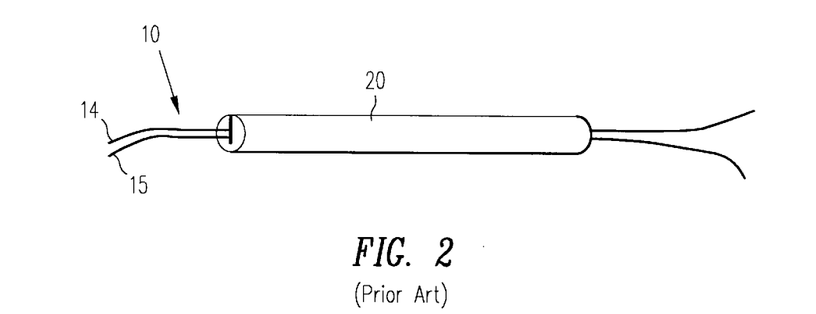
FIG. 2 shows the fused-fiber coupler of FIG. 1 mounted in a quartz sleeve.

To provide mechanical protection, as well as thermal stabilization, coupler 10 is typically placed or secured within a quartz sleeve substrate 20, as shown in FIG. 2. Thermal stabilization is achieved because quartz has a thermal expansion coefficient similar to that of the silica fiber. Coupler 10 and quartz sleeve 20 can then be placed inside a sealed package 30, typically metal, to increase mechanical and humidity protection for the fused-fiber coupler, as shown in FIG. 3.

Figure 3:
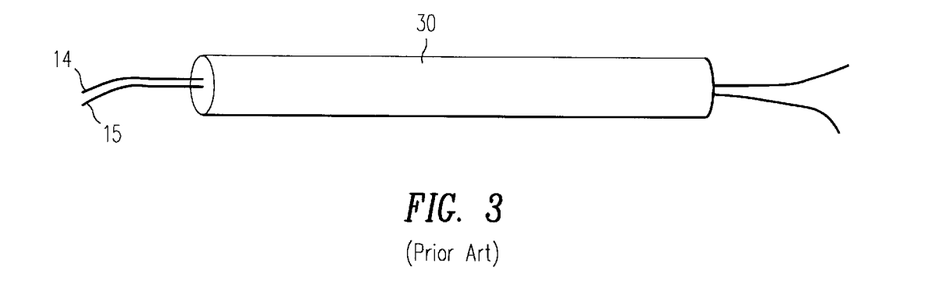
FIG. 3 shows the coupler and sleeve of FIG. 2 enclosed in a protective package.
Figure 4:
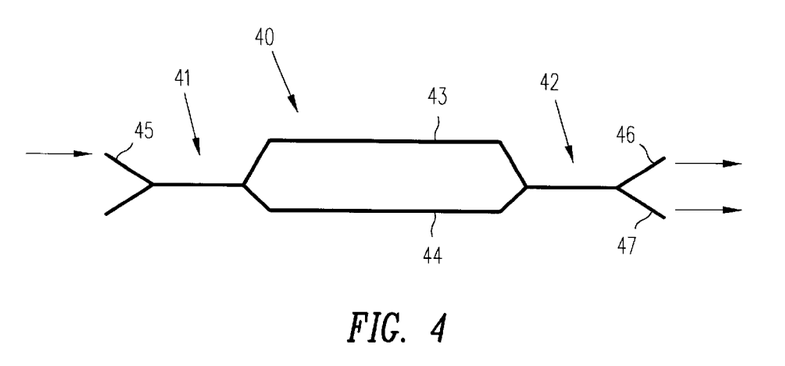
FIG. 4 shows an optical circuit of an MWDM according to the present invention.

FIG. 4 shows an optical circuit of a fused-fiber multi-window WDM (MWDM) 40 according to the present invention, which uses identical first fused-fiber coupler 41 and second fused-fiber coupler 42, similar to that shown in FIG. 3, cascaded together by optically connecting fibers 43 and 44 having different optical path lengths to form an unbalanced Mach-Zehnder Interferometer (MZI) device. Couplers 41 and 42 are typically 3-dB couplers, which divide the power entering an input terminal 45 equally between two output terminals 46 and 47. Because of the different optical path lengths, which result in the two optical signals arriving at the next coupler stage at different times, optical signals propagating through the connecting fibers are phase-shifted. If the actual lengths of the connecting fibers differ, the phase shift is due to one signal traveling further than the other signal, and if the refractive indexes of the connecting fibers differ, the phase shift is due to the two signals traveling at different phase velocities through the connecting fibers. If both the lengths and refractive indexes of the connecting fibers differ, the phase shift is due to contributions from both effects, which may increase or decrease the phase shift depending on whether the length difference in one fiber compensates for or contributes to the phase shift due to the refractive index difference between the two fibers, and vice versa.

Figure 5:
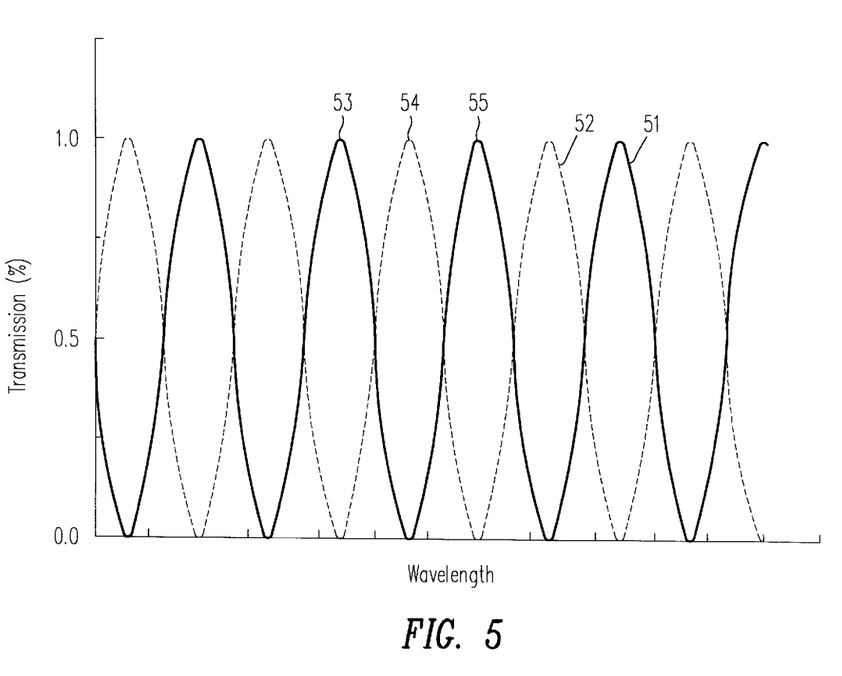
FIG. 5 shows a typical transmission spectra from the two output terminals of the MWDM of FIG. 4.

FIG. 5 shows the transmission spectrum from output terminals 46 and 47, which consists of alternating peaks and nulls. Due to the optical path length difference between the two connecting fibers 43 and 44, different constructive and destructive interference occurs at different wavelengths, resulting in the spectrum of FIG. 5. Solid line 51 represents the amplitude as a function of frequency of the output signal from one transmission channel (e.g., output terminal 46), while dashed line 52 represents the amplitude as a function of frequency for the simultaneous output signal from the other transmission channel (e.g., output terminal 47).

The channel spacing $\Delta\lambda$ of a MWDM, defined as the wavelength separation between the transmission peak wavelengths of two adjacent channels, as shown, for example, by the separation of peaks 53 and 54, can be expressed by equation 1 as follows:

$$\Delta\lambda = \frac{\lambda^2}{2(n_1 l_1 - n_2 l_2)} \quad (1)$$

where $\lambda$ is the central wavelength, and $n_1$ and $n_2$ are the respective refractive indexes and $l_1$ and $l_2$ are the respective lengths of the two connecting fibers 43 and 44. The window spacing of the MWDM, which is normally twice the channel spacing, is defined by the wavelength separation between two adjacent transmission peak wavelengths from a channel, as shown, for example, by the separation of peaks 53 and 55. The wavelength separation (or combination) capability of the MWDM depends on the number of windows and the window spacing of the MWDM.

Figure 6A:
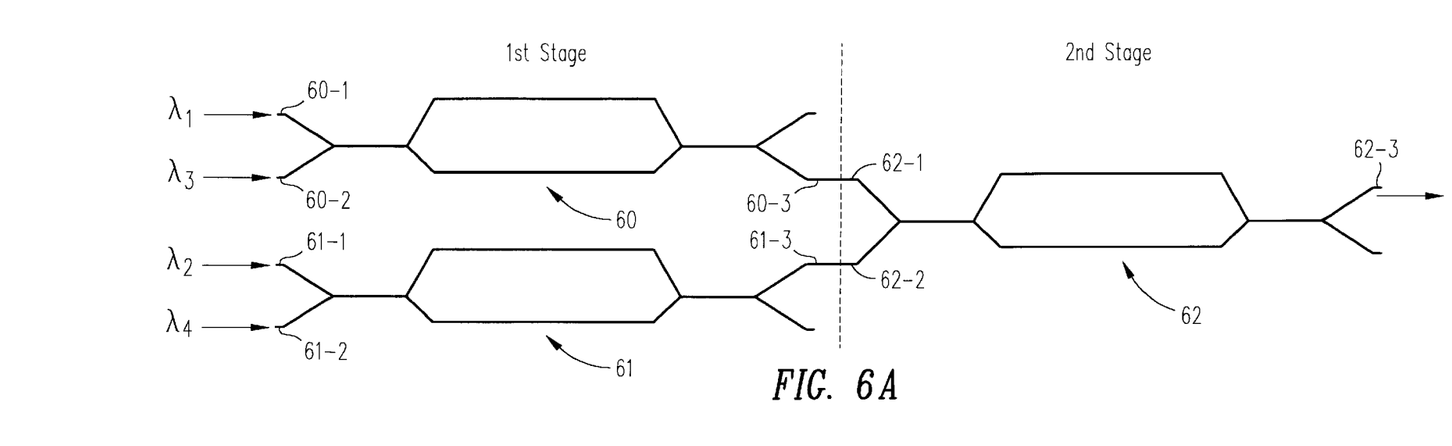
FIG. 6A shows cascading MWDMs in a plurality of stages.
Figure 6B:
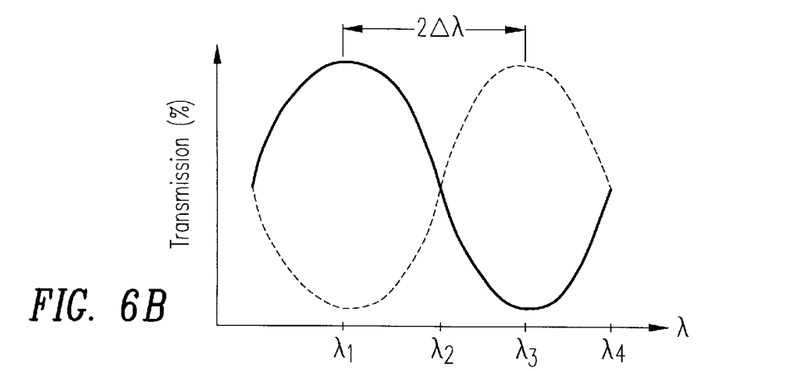
FIGS. 6B–6D show various output spectrums at the two stages in FIG. 6A.
Figure 6C:
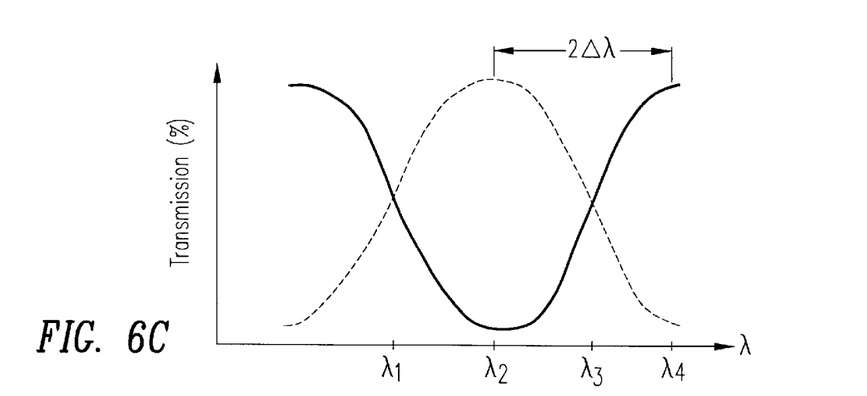
Figure 6D:
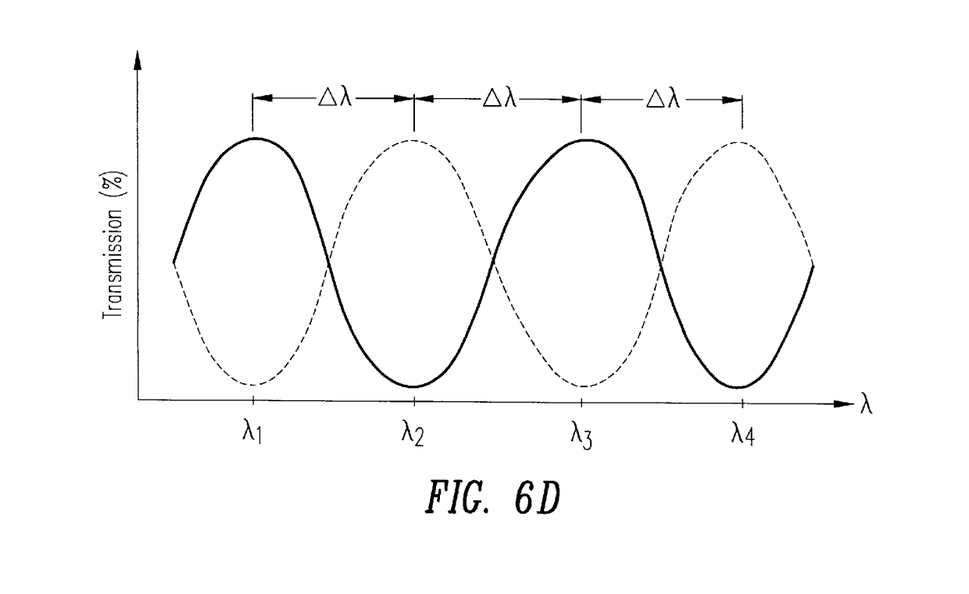

For a given usable bandwidth, the number of channels propagating through a single fiber can be increased by cascading MWDMs, as shown in FIG. 6A, and disclosed in commonly-owned U.S. patent application Ser. No. 08/799,582, incorporated by reference above. In FIG. 6A, a combiner 65, formed by cascading three MWDMs into two stages, couples signals at four wavelengths onto a single line. Signals at wavelengths $\lambda_1$ and $\lambda_3$ entering terminals 60-1 and 60-2, respectively, of MWDM 60 in the first stage are coupled and transmitted to exit terminal 60-3 of MWDM 60 with a channel separation of $2\Delta\lambda$, as shown in FIG. 6B. Similarly, signals at wavelengths $\lambda_2$ and $\lambda_4$ entering terminals 61-1 and 61-2, respectively, of MWDM 61 in the first stage are coupled and transmitted to exit terminal 61-3 of MWDM 61 with a channel separation of $2\Delta\lambda$, as shown in FIG. 6C. The output signals within the usable bandwidth from terminals 60-3 and 61-3, shown in FIGS. 6B and 6C, respectively, then enter terminals 62-1 and 62-2 of MWDM 62 in the second stage. The four signals are coupled by MWDM 62, with an output spectrum shown in FIG. 6D, and exit at terminal 62-3. The channel separation is now $\Delta\lambda$ between all channels within the usable bandwidth. The multiplexed signal can then be demultiplexed to separate the signals into four separate channels at a receiving device. For example, the combiner 65 can be reversed to form a splitter, such that the signal represented by FIG. 6D enters terminal 62-3 of MWDM 62 and is decoupled into four separate signals exiting at terminals 60-1, 60-2, 61-1, and 61-2.

Although only two cascaded stages are shown, more channels can be coupled by cascading additional stages of MWDMs, which progressively decreases the channel spacing. A more recent extension of WDM, known as dense WDM (DWDM), seeks to increase data transmission capability by coupling additional discrete wavelengths or channels onto a single fiber. Fused-fiber DWDMs may couple, for example, 8, 16, or even 32 discrete communication channels onto a single optic fiber. Thus, by cascading MWDMs of the present invention in a plurality of stages and precisely adjusting the optical path lengths (described below) of the connecting fibers, the desired interference state can be obtained for DWDM applications requiring narrow channel spacing.

Referring back to FIG. 4, fused-fiber MWDM 40 consists of first coupler 41 and second coupler 42, joined by connecting fibers 43 and 44. Couplers 41 and 42 are made according to conventional BTF technology. Connecting the couplers to achieve different optical path lengths can be accomplished by differing the refractive indexes and/or the actual lengths of the fibers.

Figure 7A:
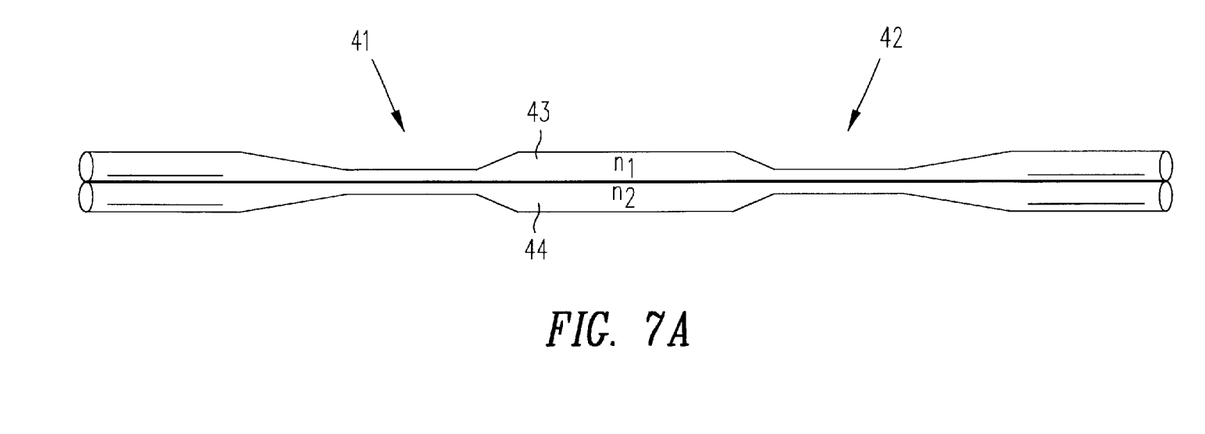
FIGS. 7A and 7B show different embodiments of an MWDM according to the present invention.
Figure 7B:
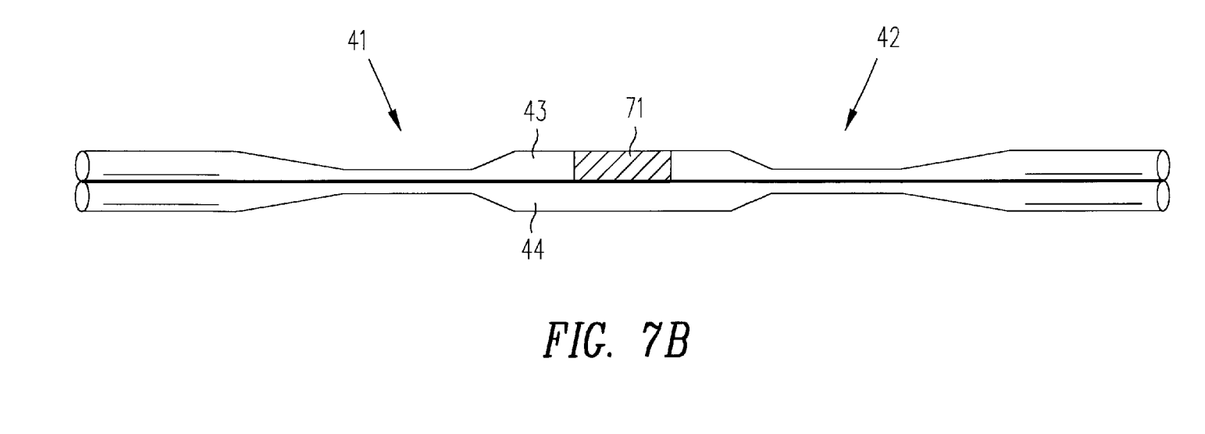

If connecting fibers having the same length are used, different optical path lengths can be obtained by fabricating first and second couplers 41 and 42 with connecting fibers 43 and 44 of different refractive indexes, as shown in FIG. 7A. In other embodiments, first and second couplers 41 and 42 are formed using connecting fibers having only portion(s) with different refractive indexes, as shown in FIG. 7B. For example, a predetermined length (dependent on the desired channel spacing) of fiber 71 having a refractive index $n_1$ can be conventionally fuse-spliced between an undoped or normal connecting fiber 43. First and second couplers 41 and 42 are then fabricated using this fiber (fiber 71 fuse-spliced between fiber 43) and normal connecting fiber 44. The refractive index $n_1$ is different than the refractive index $n_2$ of the normal fiber to obtain an optical path length difference, given by $(n_1-n_2)*l$, which results in a channel separation of $$\Delta \lambda = \frac{\lambda^2}{2(n_1 - n_2)l} \quad (2)$$

where $\lambda$ is the central wavelength, $n_1$ and $n_2$ are the respective refractive indexes of fibers 71 and 44, and l is the length of fiber 71.

Figure 7C:
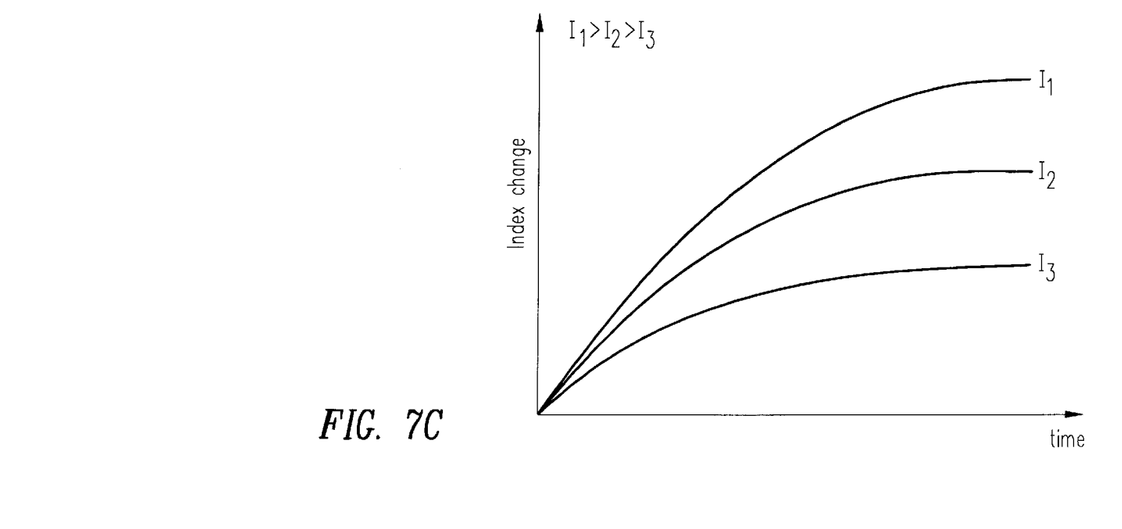
FIG. 7C shows a general relationship between the change in refractive index and the length and intensity of UV exposure.

In other embodiments, one of connecting fibers 43 or 44 of FIG. 7A or fiber 71 of FIG. 7B can be made refractive index-sensitive to UV radiation, i.e., by using hydrogen-loaded or Ge-doped fiber. Connecting fibers 43 and 44 are then exposed to UV radiation, for example, at a wavelength between 150 and 300 nm. Because the refractive index of only one connecting fiber changes from the UV radiation, an optical path length difference can be created between the two connecting fibers. Consequently, by changing the UV intensity and exposure time, which changes the difference between the refractive indexes, the window spacing and the passband wavelength can be precisely controlled according to equation (2) above. FIG. 7C shows a general relationship between the change of refractive index as a function of UV exposure time for various UV intensities. Note that, in general, the longer the UV intensity and/or exposure time, the more the refractive index changes. In other embodiments, both connecting fibers can be doped or loaded at different levels as long as the refractive index of one fiber is more UV radiation sensitive than the other.

After obtaining an optical path length difference, tension can be applied to the fused-fiber MWDM of FIG. 7A or 7B to achieve a desired passband wavelength by measuring the spectrum, e.g., with an optical spectrum analyzer, while adjusting the tension. Where the connecting fibers are doped or loaded, tension can be applied either before or after exposure to UV radiation. After obtaining the desired tension, the fused-fiber MWDM is secured, for example, to a substrate such as the one shown in FIG. 2, to maintain the desired passband wavelength.

If the optical path difference is to be accomplished through differing the actual length of the connecting fibers, as shown in FIG. 4, the fused-fiber MWDM can be fabricated using the same type of fiber for both connecting fibers. The path length difference can then be expressed as $n*(l_1-l_2)$, where n is the refractive index of the connecting fibers and $l_1$ and $l_2$ are the respective lengths of the two connecting fibers. First coupler 41 is made, for example, with connecting fiber 43 longer than connecting fiber 44. This length difference is preserved during the fabrication of second coupler 42. As the coupling region of second coupler 42 is being fused, light is applied to input terminal 45 and the resulting signal at output terminal 46 or 47 is monitored, for example, by an optical spectrum analyzer. The coupling region is pulled, using well-known methods, until the nulls of the monitored interference pattern reach a minimum, as shown in FIG. 5.

The path length difference can be changed by pulling apart first and second couplers 41 and 42 and securing the shorter connecting fiber (i.e., fiber 44) under tension to increase the refractive index of fiber 44, thereby increasing the optical path length of fiber 44. The path length difference can also be changed by heating the connecting fibers and pulling apart first and second couplers 41 and 42 to lengthen the shorter connecting fiber 44. By precisely changing the actual lengths of connecting fibers 43 and 44, the desired window spacing and passband wavelength can be obtained for specific DWDM applications by monitoring the output spectrum, e.g., with an optical spectrum analyzer.

However, the wavelength peaks and passbands also shift due to the temperature dependence of the refractive index of the fiber ($\sim 6 \times 10^{-6}/°$ C.). For example, experiments have shown that wavelength peaks change with temperature at a rate of approximately 0.007 nm/° C. for light at wavelengths around 1550 nm. Thus, for a 100° C. change in temperature, the wavelength will shift be about 0.7 nm. Such a temperature-induced wavelength shift is significant for DWDM applications due to the small separation between channels. For example, with a 16-channel DWDM, the channel spacing might only be ~0.8 nm, and thus a potential temperature-induced 0.7 nm wavelength shift can pose significant problems.

In order to minimize this effect, a passive thermal compensation (PTC) technique can be used, which is disclosed in commonly-owned U.S. patent application Ser. No. 08/962,862, entitled "Thermal Compensated Fused-fiber Dense Wavelength Division Multiplexer", filed Nov. 3, 1997, bearing Attorney Docket No. M-5074 and incorporated by reference herein in its entirety. As disclosed in the above-referenced application, either the connecting fibers or the MWDM can be mounted on a composite substrate such that as temperature increases, the composite substrate expands to decrease the tension on the connecting fibers, which shifts the wavelength in a direction opposite from the temperature-induced wavelength shift.

The following example illustrates the principle in general. A composite structure is formed by securing two smaller substrates, both made of materials with high thermal expansion coefficients such as steel or aluminum, to the upper surface ends of a large substrate having a lower thermal expansion coefficient than the two smaller substrates, such as quartz or invar. A fiber is then secured to the two smaller substrates with epoxy or other suitable means. As temperature rises, the three substrates extend their lengths in accordance with their respective thermal expansion coefficients. As a result, the two smaller substrates expand more than the larger substrate due to the higher thermal expansion coefficients of the smaller substrates. Because the smaller substrates are secured to the larger substrate, the distance between the two mounting points decreases. Equivalently, the length of the fiber between the mounting points decreases as temperature rises so that, in effect, the composite substrate "contracts" with temperature, thereby behaving as a material having a negative thermal expansion coefficient. Since the refractive index increases as temperature increases and decreases as tension decreases, index changes or, equivalently, wavelength shifts due to temperature variation are compensated.

Thus, by using PTC with the MWDM of the present invention, effects of temperature-induced wavelength shifts in DWDM can be minimized to maintain desired optical path length differences and passband wavelengths. Consequently, channel spacings of less than 7 nm, i.e., at 0.1 nm, 0.2 nm, 0.4 nm, 0.8 nm, 1.6 nm, 3.2 nm, or 6.4 nm, are possible at wavelengths around 1550 nm. Furthermore, channel spacings of less than 7 nm are also possible at wavelengths in the ranges of 900–1200 nm and 1200–1400 nm. By cascading MZI MWDMs, such as shown in FIG. 6A, the channel spacing of one stage (e.g., the second stage in FIG. 6A) is half that of the adjoining stage having more MWDMs (e.g., the first stage in FIG. 6A). Accordingly, by cascading MWDMs in two, four, eight, sixteen, thirty-two, and sixty-four stages, respectively, 1×4, 1×8, 1×16, 1×32, 1×64, and 1×128 DWDMs can be constructed with desired channel spacings of less than 7 nm.

Figure 8A:
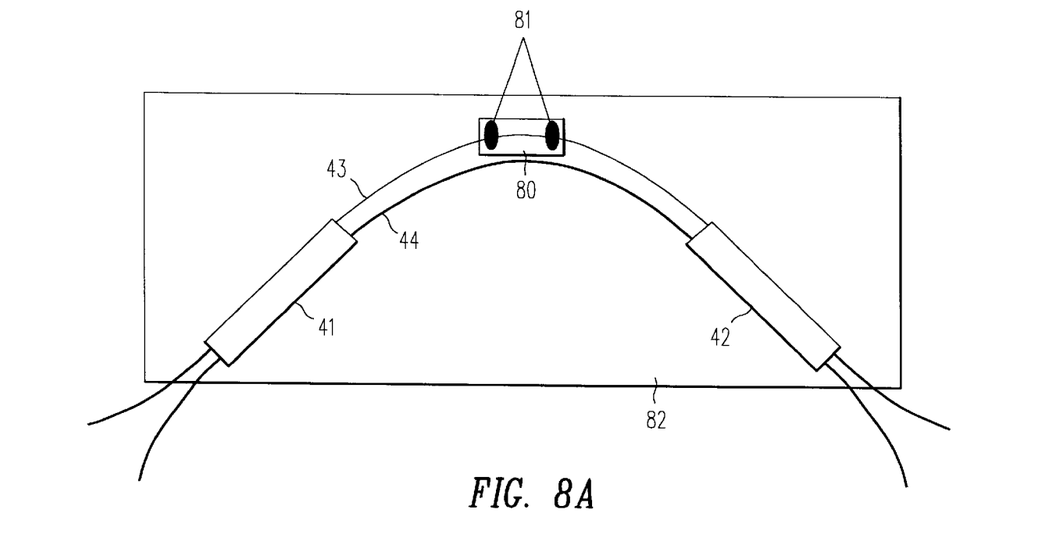
FIGS. 8A, 8B, 9A, and 9B show embodiments of the present invention with passive thermal compensation.
Figure 8B:
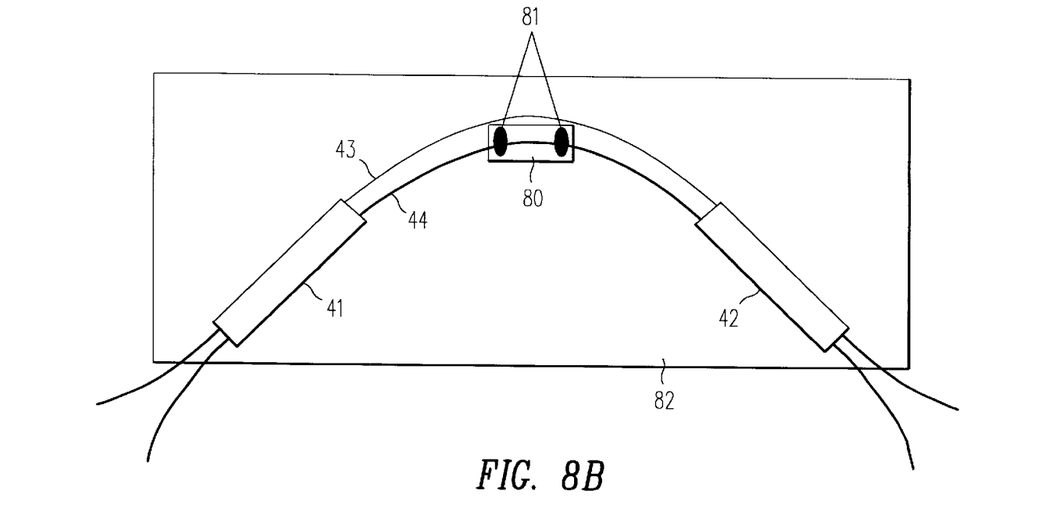
Figure 9A:
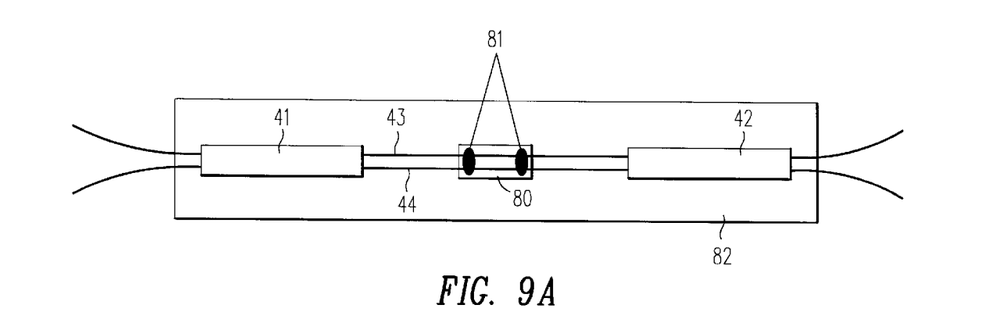
Figure 9B:
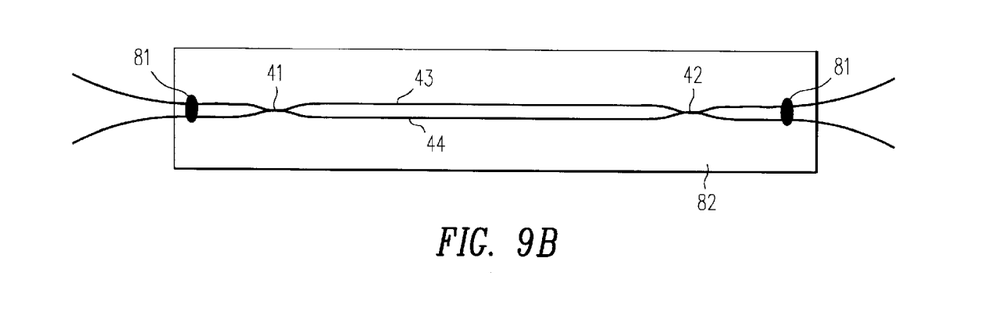

FIGS. 8A, 8B, 9A, and 9B show examples of various MWDMs using PTC techniques. In FIGS. 8A and 8B, connecting fibers 43 and 44 are different lengths, but have the same refractive indexes. Because the different lengths of connecting fibers 43 and 44 provide the desired optical path length difference, the optical path length difference increases as temperature rises because of a higher increase in the optical path length of the longer fiber. In FIGS. 9A and 9B, connecting fibers 43 and 44 are the same length, but have different refractive indexes. In this case, the different refractive indexes provide the desired optical path length difference. Thus, as temperature increases, the optical path lengths of the two fibers will increase at different rates, thereby increasing the optical path length difference.

In FIG. 8A, PTC is applied to the longer connecting fiber 43 by securing a portion of fiber 43 under tension at mounting points 81, by epoxy or other suitable methods, within a composite substrate 80 having a negative thermal expansion coefficient. For example, as disclosed in the above-reference patent application entitled "Thermal Compensated Fused-fiber Dense Wavelength Division Multiplexer", composite structure 80 can be formed with two smaller substrates having a high thermal expansion coefficient, such as steel or aluminum, which secures fiber 43 at mounting points 81, and a larger substrate having a lower thermal expansion coefficient than the two smaller substrates, such as quartz or invar, which secures to the two smaller substrates, as discussed above.

As temperature increases, substrate 80 expands relative to mounting points 81 such that the distance between mounting points 81 decreases, thereby relieving tension and decreasing the optical path length of connecting fiber 43. As a result, the optical path length difference between connecting fibers 43 and 44 is reduced, which compensates for the increased path length difference caused by the rise in temperature. Because the passband wavelengths are dependent on the optical path difference between the two connecting fibers, the desired passband wavelength can be maintained by adjusting the amount of tension reduced in fiber 43. The structure can then be secured to a base substrate 82 (for example, quartz) which has a thermal expansion coefficient matched to connecting fibers 43 and 44, where the orientation of couplers 41 and 42 can be at an angle ranging from 0° to 180° with respect to each other. Increasing the angle increases the bend in the fibers, which changes the tension in the fibers. As tension is varied, differing amounts of passive thermal compensation are applied as temperature increases. Consequently, changing the orientation of the couplers to each other provides a further method for controlling the amount of tension and PTC for MWDMs. By monitoring the output spectrum from the MWDM at various angles, a desired passband and/or PTC effect can be achieved at a specific angle of orientation.

FIG. 8B shows an embodiment where PTC is applied to the shorter connecting fiber 44 by securing a portion of fiber 44 under tension at mounting points 81 within a composite substrate 80 having a positive thermal expansion coefficient, i.e., an expansion coefficient higher than that of fiber 44. Such a substrate can be formed with two smaller substrates having a low thermal expansion coefficient, such as quartz or invar, which secures fiber 44 at mounting points 81, and a larger substrate having a higher thermal expansion coefficient than the two smaller substrates, such as steel or aluminum, which secures to the two smaller substrates.

Accordingly, substrate 80 expands relative to mounting points 81 such that the distance between mounting points 81 increases as temperature rises, thereby increasing tension and the optical path length in the connecting fiber 44. As a result, the optical path length difference is maintained because the longer fiber 43 is also increasing its optical path length due to the temperature increase. The increased optical path difference due to temperature increase is therefore offset. Again, the structure can then be secured to a base substrate 82 having a thermal expansion coefficient matched to fibers 43 and 44, where the orientation of couplers 41 and 42 is at an angle ranging from 0° to 180° with respect to each other.

In FIG. 9A, PTC is applied to the same portions of equal-length connecting fibers 43 and 44 having different refractive indexes by securing portions of both fibers 43 and 44 under tension at mounting points 81 within composite substrate 80. Substrate 80 has a negative thermal compensation coefficient relative to fibers 43 and 44 such that substrate 80 expands relative to mounting points 81 to reduce the distance between mounting points 81 as temperature increases, again as discussed above. As a result, tension is relieved, which decreases the optical path length difference between connecting fibers 43 and 44. The increased optical path length difference in connecting fiber 43 and 44 due to temperature increase is therefore compensated. The structure can then be secured on base substrate 82.

In FIG. 9B, PTC can be applied to equal-length, different refractive index connecting fibers 43 and 44 using a smaller and simpler device than shown in FIG. 9A. Couplers 41 and 42 are directly mounted on a single composite substrate 80 rather than first being enclosed in a protective package as shown in FIGS. 2 and 3. Connecting fibers 43 and 44 are secured under tension at mounting points 81 within composite substrate 80 having a negative thermal expansion coefficient. Thus, as temperature increases, substrate 80 will expand to decrease the distance between mounting points 81 and relieve tension in fibers 43 and 44. The desired optical path length difference is maintained in similar fashion as that of the structure in FIG. 9A.

The above-described embodiments of the present invention are merely meant to be illustrative and not limiting. It will thus be obvious to those skilled in the art that various changes and modifications may be made without departing from this invention in its broader aspects. For example, although specific techniques were discussed for obtaining differing optical path lengths, any suitable method can be used in accordance with this invention. Therefore, the appended claims encompass all such changes and modifications as fall within the true spirit and scope of this invention.

I claim:

1. A fused-fiber multi-window wavelength division multiplexer (MWDM) device, comprising:
    a plurality of fused-fiber couplers, wherein said plurality of fused-fiber couplers consists of a first fused-fiber coupler and a second fused-fiber coupler;
    a first connecting fiber connecting a first output terminal of said first coupler to a first input terminal of said second coupler;
    a second connecting fiber connecting a second output terminal of said first coupler to a second input terminal of said second coupler, wherein said second connecting fiber has an optical path length different than said first connecting fiber; and
    a substrate securing said first and second couplers.

2. The device of claim 1, wherein said first and second connecting fibers have different lengths.

3. The device of claim 1, wherein said first and second connecting fibers have different refractive indexes.

4. The device of claim 3, wherein said first and second connecting fibers have different refractive indexes only in portions of said first and second connecting fibers.

5. The device of claim 3, wherein the refractive indexes of said first and second connecting fibers have different sensitivities to UV light.

6. The device of claim 5, wherein one of said connecting fibers is Ge-doped.

7. The device of claim 5, wherein one of said connecting fibers is hydrogen-loaded.

8. The device of claim 1, wherein said device has a channel spacing of less than 7 nm at wavelengths around 1550 nm.

9. The device of claim 8, wherein said channel spacing is approximately 0.1 nm, 0.2 nm, 0.4 nm, 0.8 nm, 1.6 nm, 3.2 nm, or 6.4 nm.

10. The device of claim 8, wherein said channel spacing is less than 7 nm at wavelengths between 1200 nm and 1400 nm.

11. The device of claim 8, wherein said channel spacing is less than 7 nm at wavelengths between 900 nm and 1200 nm.

12. The device of claim 1, wherein said first and second fused-fiber couplers are 3-dB couplers.

13. The device of claim 1, wherein said first and second couplers are secured at an angle ranging from 0° to 180° with respect to each other.

14. The device of claim 1, further comprising a composite substrate secured to said first connecting fiber, wherein said first connecting fiber is longer than said second connecting fiber, and wherein said composite substrate expands to release tension in said first connecting fiber as temperature increases.

15. The device of claim 1, further comprising a composite substrate secured to said second connecting fiber, wherein said second connecting fiber is shorter than said first connecting fiber, and wherein said composite substrate expands to increase tension in said second connecting fiber as temperature increases.

16. The device of claim 1, further comprising a composite substrate secured to said first and second fused-fiber couplers, wherein said composite substrate expands to release tension in said first and second connecting fibers as temperature increases.

17. The device of claim 1, further comprising a composite substrate secured to said first and second connecting fibers, wherein said composite substrate expands to release tension in said first and second connecting fibers as temperature increases.

18. A dense wavelength division multiplexer (WDM) device, comprising:
    a first multi-window WDM (MWDM), comprising:
        a plurality of fused-fiber couplers, wherein said plurality of fused-fiber couplers consists of a first fused-fiber coupler and a second fused-fiber coupler;
        a first connecting fiber connecting a first output terminal of said first coupler to a first input terminal of said second coupler; and
        a second connecting fiber connecting a second output terminal of said first coupler to a second input terminal of said second coupler, wherein said second connecting fiber has an optical path length different than said first connecting fiber;
    a second MWDM connected to a first output terminal of said second coupler of said first MWDM; and
    a third MWDM connected to a second output terminal of said second coupler of said first MWDM, wherein said second and third MWDMs form a cascaded stage of MWDMs.

19. The device of claim 18, further comprising N cascaded stages of MWDMs to form a 1×N dense WDM device, wherein N is greater than 4.

20. A method of making a fused-fiber multi-window wavelength division multiplexer (MWDM) device using only two fused-fiber couplers, comprising:
    connecting two output terminals of a first fused-fiber coupler to two input terminals of a second fused-fiber coupler using two connecting fibers of different optical path lengths.

21. The method of claim 20, further comprising securing said first and second couplers to a composite substrate at an angle ranging from 0° to 180° with respect to each other.

22. The method of claim 20, wherein said two connecting fibers have different refractive indexes.

23. The method of claim 22, wherein said two connecting fibers have different refractive indexes only in portions of said fibers.

24. The method of claim 20, further comprising fuse-splicing a fiber portion between one of said two connecting fibers.

25. The method of claim 24, wherein said fiber portion has a different refractive index than said one of said two connecting fibers.

26. The method of claim 24, wherein said fiber portion has a different refractive index than the other one of said two connecting fibers.

27. The method of claim 20, further comprising sensitizing one of said two connecting fibers to UV radiation.

28. The method of claim 27, wherein said sensitizing comprises hydrogen-loading one of said two connecting fibers.

29. The method of claim 27, wherein said sensitizing comprises Ge-doping one of said two connecting fibers.

30. The method of claim 27, further comprising exposing said two connecting fibers to UV radiation to change the refractive indexes of said fibers.

31. The method of claim 20, wherein said two connecting fibers are different lengths.

32. The method of claim 31, further comprising lengthening one of said two connecting fibers to obtain a desired optical path difference.

33. The method of claim 20, further comprising securing said first connecting fiber to a composite substrate, wherein said first connecting fiber is longer than said second connecting fiber, and wherein said composite substrate expands to release tension in said first connecting fiber as temperature increases.

34. The method of claim 20, further comprising securing said second connecting fiber to a composite substrate, wherein said second connecting fiber is shorter than said first connecting fiber, and wherein said composite substrate expands to increase tension in said second connecting fiber as temperature increases.

35. The method of claim 20, further comprising securing said first and second connecting fibers to a composite substrate, wherein said composite substrate expands to release tension in said first and second connecting fibers as temperature increases.

36. The method of claim 20, further comprising securing said first and second fused-fiber couplers to a composite substrate, wherein said composite substrate expands to release tension in said first and second connecting fibers as temperature increases.

* * * * *